US007350605B2

(12) United States Patent
Mizutani et al.

(10) Patent No.: US 7,350,605 B2
(45) Date of Patent: Apr. 1, 2008

(54) IN-WHEEL MOTOR CAPABLE OF EFFICIENTLY COOLING ELECTRIC MOTOR AND REDUCTION GEAR

(75) Inventors: Ryoji Mizutani, Nishikamo-gun (JP); Atsushi Torii, Nishio (JP); Shigetaka Isogai, Nishio (JP)

(73) Assignees: Toyota Jidosha Kabushiki Kaisha, Toyota (JP); Aisin Seiki Kabushiki Kaisha, Kariya (JP)

( * ) Notice: Subject to any disclaimer, the term of this patent is extended or adjusted under 35 U.S.C. 154(b) by 91 days.

(21) Appl. No.: 10/933,407

(22) Filed: Sep. 3, 2004

(65) Prior Publication Data

US 2005/0061565 A1 Mar. 24, 2005

(30) Foreign Application Priority Data

Sep. 4, 2003 (JP) ............................ 2003-313007

(51) Int. Cl.
*B60K 7/00* (2006.01)

(52) U.S. Cl. .................. 180/65.5; 180/65.1; 180/65.6; 903/906; 903/909

(58) Field of Classification Search ............... 180/65.5, 180/65.1, 65.6, 65.7; 903/906, 909
See application file for complete search history.

(56) References Cited

U.S. PATENT DOCUMENTS 5,014,800 A * 5/1991 Kawamoto et al. ........ 180/65.5
5,087,229 A * 2/1992 Hewko et al. .............. 475/149
5,127,485 A * 7/1992 Wakuta et al. ............. 180/65.5
5,150,763 A * 9/1992 Yamashita et al. .......... 180/252
5,156,579 A * 10/1992 Wakuta et al. .............. 475/161
5,163,528 A * 11/1992 Kawamoto et al. ........ 180/65.5
5,180,180 A * 1/1993 Yamashita et al. .......... 180/253
5,382,854 A * 1/1995 Kawamoto et al. ....... 310/67 R
5,633,544 A * 5/1997 Toida et al. ............. 310/67 R
5,691,584 A * 11/1997 Toida et al. ............. 310/67 R
6,386,553 B2 * 5/2002 Zetterstrom ................ 280/5.51
2002/0134597 A1 * 9/2002 Mann et al. ............... 180/65.5
2004/0099455 A1 * 5/2004 Nagaya ..................... 180/65.5
2005/0236198 A1 * 10/2005 Jenkins ...................... 180/65.5

FOREIGN PATENT DOCUMENTS

EP 492290 A1 * 7/1992
JP A 10-42518 2/1998
JP B2 3337279 8/2002

* cited by examiner

*Primary Examiner*—Christopher P. Ellis
*Assistant Examiner*—John D Walters
(74) *Attorney, Agent, or Firm*—Oliff & Berridge, PLC

(57) ABSTRACT

An in-wheel motor includes a wheel disc, a wheel hub, a case, a motor, a planetary gear and a shaft. The wheel disc is connected to the wheel hub. The planetary gear is connected to the motor's rotor. The case includes subcases and a diaphragm. One subcase is arranged to have a side portion closer to the vehicle's body and accommodates the motor and the planetary gear. The motor and the planetary gear are adjacently arranged and fixed to one subcase. The other subcase is arranged closer to the wheel disc and fixed at a plane perpendicular to the shaft by a screw to one subcase.

15 Claims, 3 Drawing Sheets

IN-WHEEL MOTOR CAPABLE OF EFFICIENTLY COOLING ELECTRIC MOTOR AND REDUCTION GEAR

This nonprovisional application is based on Japanese Patent Application No. 2003-313007 filed with the Japan Patent Office on Sep. 4, 2003, the entire contents of which are hereby incorporated by reference.

BACKGROUND OF THE INVENTION

1. Field of the Invention

The present invention relates generally to in-wheel motors and particularly to in-wheel motors capable of efficiently cooling an electric motor and a reduction gear.

2. Description of the Background Art

Conventional in-wheel motors include an electric motor, a reduction gear and a case. The electric motor includes a stator iron core, a stator coil and a rotor. The reduction gear is formed of a planetary gear unit.

The case is formed of a case associated with the vehicle and arranged closer to the center of the vehicle, and a case associated with a wheel and arranged closer to a wheel disc. The case associated with the vehicle is in the form of a dish and that associated with the wheel is in the form of a cup and fixed to the case associated with the vehicle.

The electric motor and the reduction gear are accommodated in the disc associated with the wheel. The electric motor's stator iron core is fixed to the case associated with the wheel. The stator coil is wound around the stator iron core. The rotor is arranged inner than the stator iron core and the stator coil. The reduction gear is arranged adjacent to the electric motor and fixed to the case associated with the wheel (Japanese Patent Laying-Open No. 10-42518).

Thus conventional in-wheel motors have an electric motor and a reduction gear fixed to the case associated with the wheel.

In other words, the conventional in-wheel motors do not have the electric motor or the reduction gear fixed to the vehicle-associated case, which serves as a path of cooling air, and thus have a disadvantageously limited capability to cool the electric motor and the reduction gear.

SUMMARY OF THE INVENTION

The present invention has been made to overcome such disadvantage and contemplates an in-wheel motor capable of efficiently cooling an electric motor and a reduction gear.

In accordance with the present invention an in-wheel motor includes an electric motor, a reduction gear, a wheel, a rotation shaft and a case. The reduction gear is arranged adjacent to the electric motor to change an output of the electric motor in speed. The wheel is rotated by an output of the reduction gear. The rotation shaft transmits the output of the reduction gear to the wheel. The case accommodates the electric motor and the reduction gear. The case includes a first case arranged farther from the wheel, and a second case arranged closer to the wheel and connected at a plane perpendicular to the rotation shaft to the first case. The electric motor and the reduction gear are fixed to the first case.

Preferably the in-wheel motor further includes a brake provided at the second case.

Preferably the first case has a suspension fixture.

Furthermore in accordance with the present invention an in-wheel motor includes an electric motor, a reduction gear, a wheel, a rotation shaft and a case. The reduction gear is coaxial with the electric motor to reduce an output of the electric motor. The wheel is rotated by an output of the reduction gear. The rotation shaft transmits the output of the reduction gear to the wheel. The case accommodates the electric motor and the reduction gear. The case includes a first case arranged farther from the wheel and closer to a vehicle's body, and a second case arranged closer to the wheel and fixed at a plane perpendicular to the rotation shaft to the first case. The electric motor and the reduction gear are arranged in the first case.

Preferably the first case has a brake caliper attached thereto and a brake rotor rotating as the motor driven wheel rotates is attached adjacent to the second case.

In the present in-wheel motor an electric motor and a reduction gear are fixed to a first case arranged opposite and farther from a wheel. The electric motor and the reduction gear generate heat, which is transmitted to the first case, which is cooled by cooling air produced as the vehicle having the in-wheel motor mounted therein runs.

Thus in accordance with the present invention the electric motor and reduction gear can be cooled more efficiently.

Furthermore the present in-wheel motor allows heat generated at the brake to be transmitted to a second case, rather than the first case having the electric motor and reduction gear fixed thereto.

Thus the present invention can reduce the heat generated at the brake that is transmitted to the electric motor and the reduction gear. Consequently the electric motor and the reduction gear can be cooled more efficiently.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The present invention in embodiment will now be described with reference to the drawings more specifically. In the figures, identical or like components are identically labeled and will not be described repeatedly.

Figure 1:
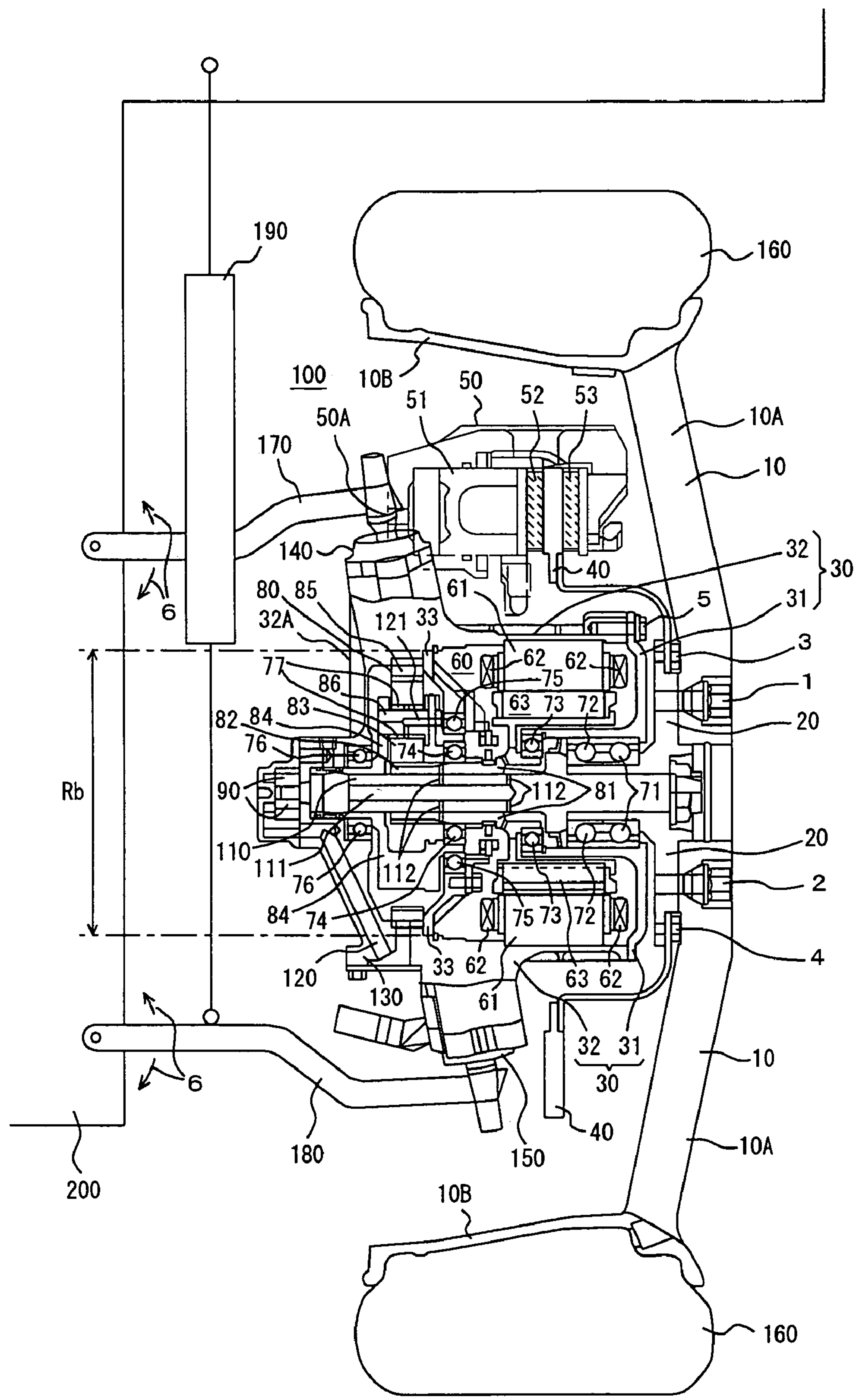
FIG. 1 is a schematic cross section of a motor driven wheel including an in-wheel motor in accordance with an embodiment of the present invention.

FIG. 1 is a schematic cross section of a motor driven wheel including an in-wheel motor in accordance with an embodiment of the present invention. With reference to FIG. 1, a motor driven wheel 100 includes a wheel disc 10, a wheel hub 20, a case 30, a brake rotor 40, a brake caliper 50, a motor 60, bearings 73-77, a planetary gear 80, an oil pump 90, a shaft 110, an oil path 120, ball joints 140, 150, and a tire 160.

Note that wheel disc 10, wheel hub 20, case 30, brake rotor 40, brake caliper 50, motor 60, bearings 73-77, planetary gear 80, oil pump 90, shaft 110, oil path 120 and a ball joint 140, 150 configure an "in-wheel motor" in accordance with the present invention.

Wheel disc 10 is provided generally in the form of a cap and formed of a disc 10A and a rim 10B. Wheel disc 10 may be adapted to accommodate wheel hub 20, case 30, brake rotor 40, brake caliper 50, motor 60, bearings 73-77, planetary gear 80, oil pump 90, shaft 110, oil path 120 and ball joint 140, 150. Wheel disc 10 has disc 10A connected by a screw 1, 2 to wheel hub 20. Wheel hub 20 has an inner end spline-fitted into shaft 110.

Brake rotor 40 has an inner end fixed by a screw 3, 4 to an outer end of wheel hub 20 and has an outer end arranged to pass through brake caliper 50. Brake caliper 50 is fixed to case 32. Brake caliper 50 includes a brake piston 51 and brake pads 52 and 53 sandwiching a periphery of brake rotor 40.

When brake oil is supplied through an opening 50A, brake piston 51 moves rightwards as seen on the plane of the figure to push brake pad 52 rightwards. When brake pad 52 is moved by brake piston 51 rightwards, brake pad 53 responsively moves leftwards as seen on the plane of the figure. Brake pads 52 and 53 thus sandwich the periphery of brake rotor 40 and motor driven wheel 100 is thus braked.

Figure 2:
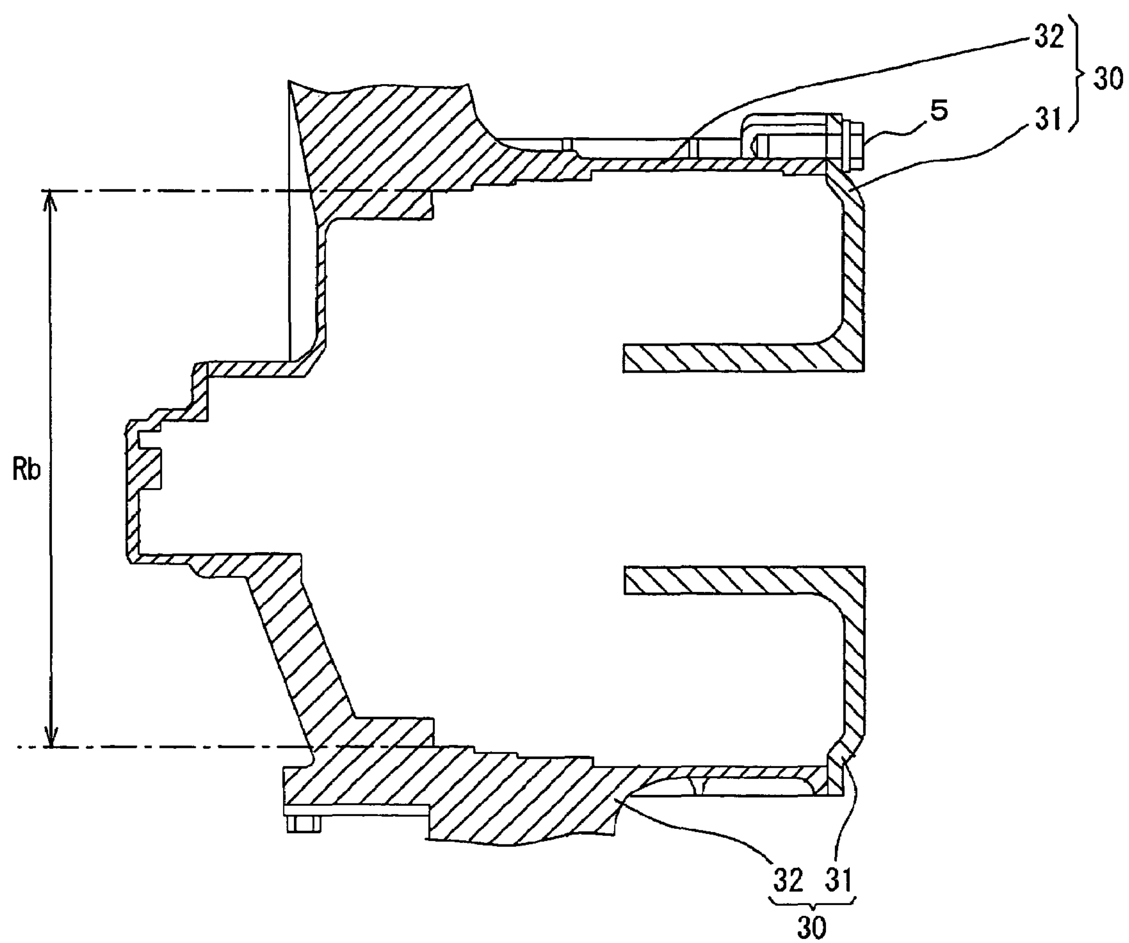
FIG. 2 is an enlarged view of the case shown in FIG. 1.

On a left hand of wheel hub 20 as seen on the plane of the figure, case 30 is arranged. Case 30 includes cases 31, 32 and a diaphragm 33. FIG. 2 is an enlarged view of case 30 shown in FIG. 1. Note that in FIG. 2 diaphragm 33 is not shown. With reference to FIG. 2, case 31 is provided generally in the form of the letter L and case 32 is provided generally in the form of a horse shoe. Again with reference to FIG. 1 case 31 is arranged closer to wheel disc 10 and case 32 is arranged closer to the vehicle's body 200. Case 31 is connected at a plane perpendicular to shaft 110 (an axis of rotation) by a screw 5 to case 32. Case 32 accommodates motor 60 and planetary gear 80. Diaphragm 33 separates motor 60 and planetary gear 80.

Motor 60 includes a stator core 61, a stator coil 62 and a rotor 63. Stator core 61 is fixed to case 32. Stator coil 62 is wound around stator core 61. If motor 60 is a 3-phase motor, stator coil 62 is formed of a U-phase coil, a V-phase coil and a W-phase coil.

Rotor 63 is arranged inner than stator core 61 and stator coil 62.

Planetary gear 80 includes a sun gear shaft 81, a sun gear 82, a pinion gear 83, a planetary carrier 84, a ring gear 85 and a pin 86. Sun gear shaft 81 is connected to motor 60 at rotor 63 and rotatably supported by bearings 73, 74. Sun gear 82 is connected to sun gear shaft 81.

Pinion gear 83 meshes with sun gear 82 and is rotatably supported by bearing 77 arranged at a circumference of pin 86. Planetary carrier 84 is connected to pinion gear 83 and spline-fitted into shaft 110. Planetary carrier 84 is rotatably supported by bearings 75, 76. Ring gear 85 is fixed to case 32. Pin 86 is supported by pinion gear 83 via bearing 77.

Oil pump 90 is provided at one end of shaft 110. Shaft 110, having wheel hub 20 and planetary carrier 84 spline-fitted thereinto, as has been described previously, is rotatably supported by bearing 76, and grease 71, 72 allows the shaft to smoothly rotate. Shaft 110 incorporates an oil path 111 and an oil hole 112.

Oil path 121 is provided internal to pin 86 of planetary gear 80. Oil path 120 has one end connected to oil pump 90 and the other end inserted into an oil reservoir 130.

Oil pump 90 pumps up through oil path 120 the oil reserved in oil reservoir 130 and supplies the pumped-up oil to oil path 111.

Ball joint 140, 150 is fixed to case 32. An upper arm 170 has one end connected to ball joint 140 and the other end fixed to the vehicle's body 200. A lower arm 180 has one end connected to ball joint 150 and the other end fixed to body 200. Upper and lower arms 170 and 180 have their respective other ends fixed to body 200 so that the arms can be rotated as desired in a direction indicated by an arrow 6. Furthermore, a spring 190 is provided between body 200 and lower arm 180. Thus, motor driven wheel 100 is suspended from body 200.

Tire 160 is fixed to an outer periphery in rim 10B of wheel disc 10.

As upper and lower arms 170 and 180 are fixed to body 200 rotatably in the direction of arrow 6 and lower arm 180 is connected via spring 190 to body 200, upper and lower arms 170 and 180 and spring 190 function as suspension. More specifically, the present in-wheel motor is suspended from body 200 by the suspension, and ball joints 140 and 150 configure a "suspension fixture".

In the present invention, case 32 is integrally molded generally in the form of a horse shoe and has a side portion 32A arranged to be located closer to body 200, and planetary gear 80 is initially introduced into case 32 through the case's opening (located closer to wheel disc 10) and ring gear 85 is fixed to case 32. Then, diaphragm 32 is introduced through the opening into case 32 and fixed to an end surface of ring gear 85 and case 32 by a snap ring.

In this case, planetary gear 80 has an outer diameter set to be smaller than that of case 32 at a portion having diaphragm 33 arranged, i.e., a bearing holder diameter Rb, and diaphragm 33 can be fixed to the end surface of ring gear 85 and case 32.

Subsequently, stator core 61 with stator coil 62 wound therearound is introduced through the opening into case 32 and stator core 61 is fixed to case 32. Then, rotor 63 is introduced through the opening into case 32. Finally, case 31 is connected with screw 5 to case 32 and motor 60 and planetary gear 80 are accommodated in case 30.

As motor 60 is separated from planetary gear 80 only by diaphragm 33, motor 60 is arranged adjacent to planetary gear 80.

Thus the present invention is characterized by fixing adjacently arranged motor 60 and planetary gear 80 to case 32 integrally molded and arranged closer to body 200 (or farther from wheel disc 10). By this feature, heat generated at motor 60 and planetary gear 80 can be released to case 32 cooled by cooling air produced as the vehicle having motor driven wheel 100 mounted therein runs. As a result, motor 60 and planetary gear 80 can be cooled more efficiently.

Normally, motor driven wheel 100 is braked by motor 60 regeneratively. If motor 60 fails due to some reason, brake rotor 40 and brake caliper 50 brake motor driven wheel 100. When brake rotor 40 and brake caliper 50 brake motor driven wheel 100, brake rotor 40 and brake pads 52, 53 at a portion where they contact each other generate heat.

Brake rotor 40, as has been described previously, has an inner end fixed to wheel hub 20. As such, the heat generated at the portion where brake rotor 40 and brake pads 52, 53 contact each other is transmitted to wheel hub 20. Wheel hub 20 receives the heat, which is also transmitted to case 31. In other words, the heat generated at the portion where brake rotor 40 and brake pads 52, 53 contact each other is transmitted to case 30. The heat is, however, transmitted to case 31, rather than case 32 having motor 60 and planetary gear 80 fixed thereto. As such, in terms of heat conduction, the brake, formed of brake rotor 40 and brake caliper 50, which configuration will also applies hereinafter, is provided to case 31, rather than case 32 having motor 60 and planetary gear 80 fixed thereto.

Thus the present invention is characterized in that the brake rotor 40 is provided to case 31, rather than case 32 having motor 60 and planetary gear 80 fixed thereto. This feature can contribute to a reduced amount of heat generated at the brake and transmitted to motor 60 and planetary gear 80. Motor 60 and planetary gear 80 can be cooled more efficiently.

When a switching circuit (not shown) mounted in body 200 is operated to supply stator coil 62 with an alternating current, rotor 63 rotates and motor 60 outputs a prescribed torque which is turn transmitted via sun gear shaft 81 to planetary gear 80. Planetary gear 80 receives the torque from sun gear shaft 81 and changes it by sun gear 82 and pinion gear 83, i.e., changes it in speed (or reduces it) and outputs it to planetary carrier 84. Planetary carrier 84 receives the torque from planetary gear 80 and transmits it to shaft 110, and shaft 110 rotates wheel hub 20 and wheel disc 10 at a prescribed rate of rotation. Thus motor driven wheel 100 rotates at a prescribed rate of rotation. Motor 60 and planetary gear 80 generate heat, which is conducted to case 32, and case 32 is cooled by cooling air generated as the vehicle mounting motor driven wheel 100 therein runs. In other words, the ability to cool motor 60 and planetary gear 80 can be enhanced as the vehicle runs.

Oil pump 90 pumps up oil from oil reservoir 130 through oil path 120 and supplies the pumped-up oil to oil path 111 provided internal to shaft 110.

Oil path 111 receives the oil, and as it moves through path 111 the oil is jetted out through oil hole 112 by a centrifugal force generated as shaft 110 rotates. Oil path 121 supplies the oil jetted out from shaft 110 to planetary gear 80 to lubricate planetary gear 80. The oil jetted out from shaft 110 also cools stator coil 62 and lubricates bearings 73-77.

When the vehicle is running and brake rotor 40 and brake caliper 50 brake motor driven wheel 100, brake rotor 40 and brake caliper 50 at a portion where they contact each other generate heat, which is transmitted to case 31, as has been described previously. As case 31 is not formed integral with case 32, motor 60 and planetary gear 80 can receive a reduced amount of heat. Accordingly, motor 60 and planetary gear 80 can be cooled more efficiently.

Figure 3:
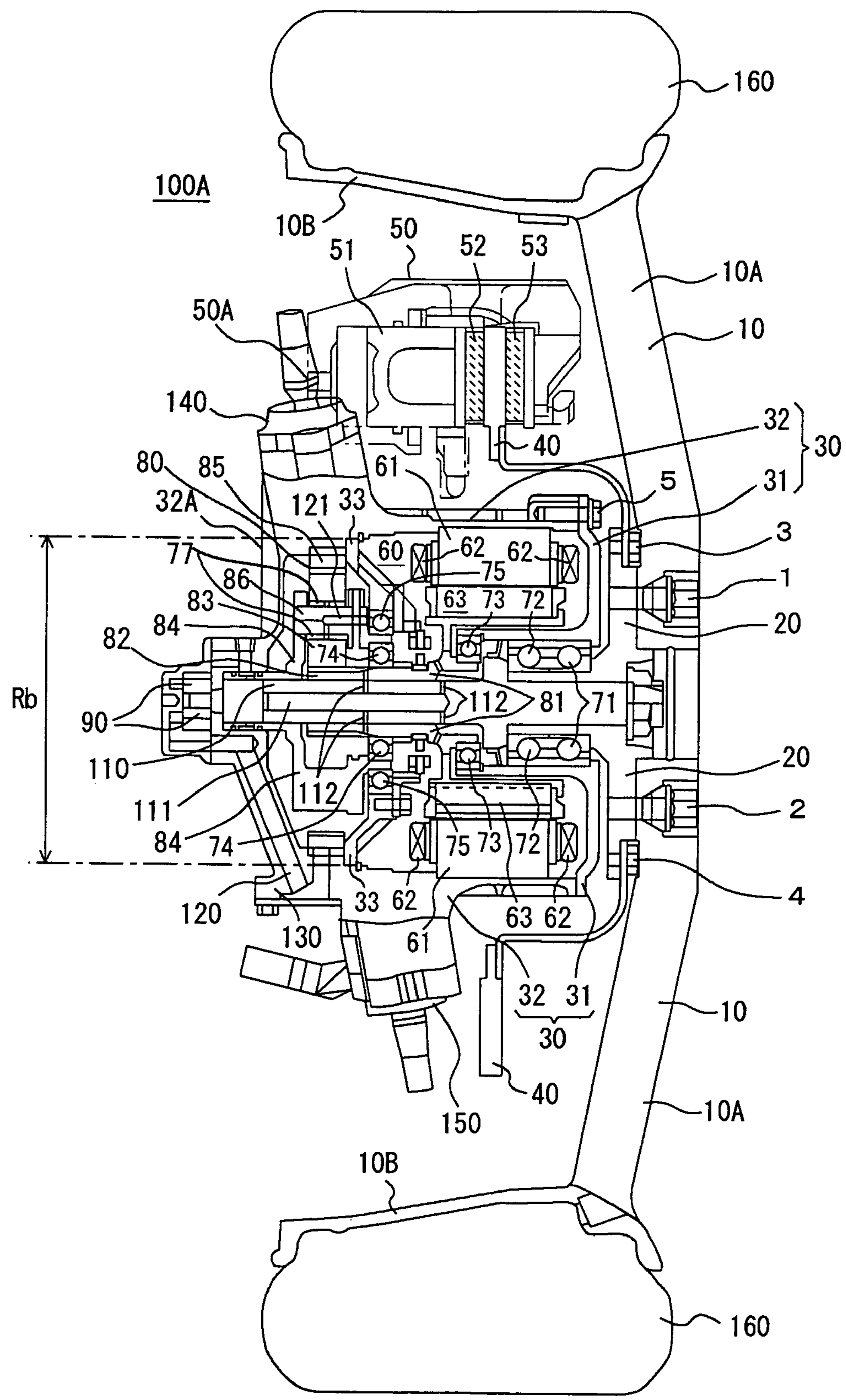
FIG. 3 is another schematic cross section of the motor driven wheel including the present in-wheel motor.

FIG. 3 is another schematic conception of a motor driven wheel including an in-wheel motor in accordance with the present invention. With reference to FIG. 3, a motor driven wheel 100A is identical to motor driven wheel 100 except that bearing 76 is removed.

In motor driven wheel 100A planetary carrier 84 is rotatably supported only by bearing 75. As shown in FIG. 3, planetary carrier 84 is held only by one bearing 75. This is referred to as a "cantilever bearing system". This system allows motor driven wheel 100A to have shaft 110 reduced in length. As a result, motor driven wheel 100A can be compact.

The other components and features are identical to those of motor driven wheel 100.

Note that motor 60 configures an "electric motor" and planetary gear 80 configures a "reduction gear".

Furthermore, wheel disc 10 and wheel hub 20 configure a "wheel".

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An in-wheel motor comprising:

an electric motor;

a reduction gear arranged adjacent to said electric motor to change an output of said electric motor in speed;

a wheel rotated by an output of said reduction gear;

a rotation shaft transmitting said output of said reduction gear to said wheel; and a case accommodating said electric motor and said reduction gear, said case including a first case arranged farther from said wheel, and a second case arranged closer to said wheel and connected to said first case at a plane perpendicular to said rotation shaft, said electric motor being fixed to said first case and said reduction gear being fixed directly to said first case.

2. The in-wheel motor of claim 1, further comprising a brake provided at said second case.

3. The in-wheel motor of claim 1, wherein said first case has a suspension fixture.

4. An in-wheel motor comprising:

an electric motor;

a reduction gear coaxial with said electric motor to reduce an output of said electric motor;

a wheel rotated by an output of said reduction gear;

a rotation shaft transmitting said output of said reduction gear to said wheel; and a case accommodating said electric motor and said reduction gear, said case including a first case arranged farther from said wheel and closer to a vehicle's body, second case arranged closer to said wheel and fixed to said first case at a plane perpendicular to said rotation shaft, and a path that allows said electric motor and said reduction gear to be in direct thermally-conductive communication with said first case and does not include said second case.

5. The in-wheel motor of claim 4, wherein said first case has a brake caliper attached thereto, and a brake rotor rotating as the motor driven wheel rotates is attached adjacent to said second case.

6. The in-wheel motor of claim 5, wherein said brake rotor is fixed to a wheel hub of said wheel.

7. The in-wheel motor of claim 4, wherein said second case is provided with a flange supporting said wheel.

8. The in-wheel motor of claim 4, wherein said first case has a brake caliper attached thereto and said second case has a brake rotor attached thereto via a bearing, said brake rotor having a contact surface sandwiched by said brake caliper.

9. The in-wheel motor of claim 8, wherein heat generated at said contact surface is first transmitted by conduction to said second case before being transmitted by conduction to said first case, and a greater amount of heat generated at said contact surface is transmitted by conduction to said second case than to said first case.

10. The in-wheel motor of claim 9, wherein said first case is cooled by air as said vehicle runs.

11. An in-wheel motor comprising:

an electric motor;

a reduction gear arranged adjacent to said electric motor to change an output of said electric motor in speed;

a wheel rotated by an output of said reduction gear;

a rotation shaft transmitting said output of said reduction gear to said wheel; and a case accommodating said electric motor and said reduction gear, said case including a first case arranged farther from said wheel, and a second case arranged closer to said wheel and connected to said first case at a plane perpendicular to said rotation shaft, wherein said electric motor and said reduction gear are fixed to said first case, said reduction gear is fixed directly to said first case, and said electric motor and said reduction gear are aligned in said first case in an axial direction of said rotation shaft.

12. The in-wheel motor of claim 11, wherein said electric motor is arranged closer to said wheel than said reduction gear.

13. The in-wheel motor of claim 11, wherein said reduction gear has a ring gear fixed to an inner circumferential surface of said first case.

14. The in-wheel motor of claim 11, wherein said motor outputs a torque which is in turn transmitted via a hollow sun gear shaft to a planetary gear, said planetary gear receives said torque from said sun gear shaft, changes said torque in speed and outputs said torque to a planetary carrier, and said planetary carrier outputs said torque which is in turn output toward said wheel via a shaft passing through said hollow sun gear shaft.

15. An in-wheel motor comprising:

an electric motor;

a reduction gear coaxial with said electric motor to reduce an output of said electric motor;

a wheel rotated by an output of said reduction gear;

a rotation shaft transmitting said output of said reduction gear to said wheel; and a case accommodating said electric motor and said reduction gear, said case including a first case arranged farther from said wheel and closer to a vehicle's body, and a second case arranged closer to said wheel and fixed to said first case at a plane perpendicular to said rotation shaft, said electric motor and said reduction gear being arranged in said first case and being in direct thermally-conductive communication with said first case, said first case being integrally molded.

* * * * *